United States Patent [19]

Bellisio

[11] 4,161,634

[45] Jul. 17, 1979

[54] COUNT-DOWN ADDRESSING SYSTEM

[75] Inventor: Jules A. Bellisio, Wall Township, Monmouth County, N.J.

[73] Assignee: Bell Telephone Laboratories, Incorporated, Murray Hill, N.J.

[21] Appl. No.: 929,431

[22] Filed: Jul. 31, 1978

[51] Int. Cl.² .............................................. H04B 3/46
[52] U.S. Cl. ....................... 179/175.31 R; 179/15 AL; 178/2 C; 340/168 B
[58] Field of Search ............... 179/175.31 R, 175.3 R, 179/175, 175.3 F, 15 AL, 15 BF, 15 BL, 2 R, 2 A, 2 M; 340/147 R, 146.1 E, 146.1 BE, 168 B; 178/2, 3, 4.1 R, 4.1 B

[56] References Cited

U.S. PATENT DOCUMENTS

| | | | |
|---|---|---|---|
| 2,509,365 | 5/1950 | Parmentier | 179/175.31 |
| 3,083,270 | 3/1963 | Mayo | 179/175.31 |
| 3,172,965 | 3/1965 | Waldick | 179/175.31 |
| 3,392,242 | 7/1968 | Smith et al. | 179/175.31 |
| 3,410,968 | 11/1968 | Hockreutiner | 179/175.31 |
| 3,560,670 | 2/1971 | Heyes et al. | 179/175.31 |
| 3,617,657 | 11/1971 | Brewer | 179/175.31 |
| 3,760,127 | 9/1973 | Camiciottoli et al. | 179/175.31 |
| 3,814,840 | 6/1974 | Lubarsky, Jr. et al. | 178/2 C |
| 3,911,226 | 10/1975 | Angelle et al. | 179/15 BL |
| 4,025,737 | 5/1977 | Brewer | 179/175.31 |
| 4,069,402 | 1/1978 | Mantovani et al. | 179/175.31 |
| 4,122,358 | 10/1978 | Altmann | 179/175.31 |

Primary Examiner—Kathleen H. Claffy
Assistant Examiner—Gerald L. Brigance
Attorney, Agent, or Firm—Sylvan Sherman

[57] ABSTRACT

A system is described for randomly addressing any one of a plurality of remotely located stations connected by means of an electromagnetic wavepath. At the addressing point an addressing signal, comprising a series of m signal bursts, is generated and coupled onto the wavepath (11), where m is an integer and corresponds to the number of stations the addressed station is away from the addressing point. Each remote station includes means (33, 34, 41, 43) for deleting one signal burst and retransmitting the remaining signal bursts. Each station also includes means (34, 38, 42, 43, 44, 50, 51) for recognizing when only a single signal burst is received and for responding in a prescribed manner. By means of such a "count-down" technique, the $m^{th}$ station from the addressing station is accessed. it is an advantage of such a system that the addressing circuit is the same at all the remote stations.

8 Claims, 4 Drawing Figures

COUNT-DOWN ADDRESSING SYSTEM

TECHNICAL FIELD

This invention relates to circuit arrangements for addressing any one of a plurality of remote stations, such as regenerators and repeaters in a long distance communication system.

BACKGROUND ART

Techniques for addressing remote stations, such as repeaters and regenerators, are well known in the art. One such means is to interrogate the stations sequentially, as described in U.S. Pat. No. 3,410,968. While a sequential addressing system may be adequate for many applications, it has the disadvantage that commands to the addressed station must be given separately and only after the addressed station is reached. By contrast, an addressing system capable of randomly addressing any remote station may require no further command signals inasmuch as the mere accessing of the desired station in and by itself may be sufficient to initiate the prescribed actions.

In other addressing systems, exemplified by U.S. Pat. Nos. 3,760,127; 3,172,965; 3,617,657; and 4,025,737, each of the remote stations is characterized by some unique feature which distinguishes it from every other station. The obvious disadvantage of such a system is that each station must be different than every other station. This serves to increase the cost of implementing and operating the system, and requires added care whenever changes are made to insure that there is no duplication among the stations which would serve to create operating ambiguities. Advantageous, an addressing system should be such as to permit the use of identical stations that can be randomly accessed.

SUMMARY OF THE INVENTION

In an addressing system, in accordance with the present invention, the addressing circuitry of all of the remote station is identical and is designed to respond to a series of one or more signal bursts by removing one burst and retransmitting the remaining bursts. The stations are further designed to respond in a prescribed manner when one and only one signal burst is received.

Thus, to address a remote station along a sequence of remote stations, a series of m bursts is transmitted by the addressing station, where m is equal to the number that the station to be addressed occupies in the sequence of stations from the addressing point.

As noted above, it is an advantage of the present invention that the addressing circuitry can be identical in all of the remote stations. No special filter, code, or signal generator is required for any of the respective stations.

It is a further advantage of the system that no separate signal path is required. In a communication system, the addressing signal bursts can be superimposed as a modulation upon the traffic data stream or upon a carrier signal.

It is an additional advantage of the system that any stations can be randomly addressed as required.

DETAILED DESCRIPTION

Figure 1:
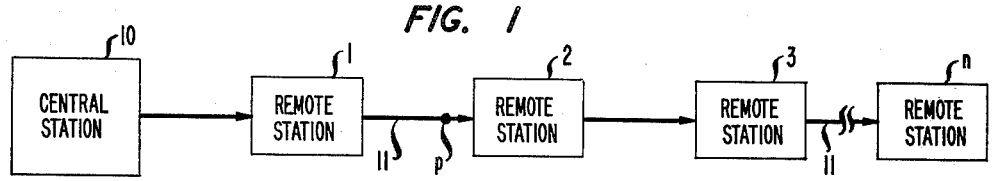
FIG. 1 shows, in block diagram, a system of the type to which the invention relates.

Referring to the drawings, FIG. 1 shows, in block diagram, a system of the type to which the invention relates comprising a central station 10 and a plurality of remote stations 1, 2, 3 . . . n. In a communication system, station 10 would be one terminal of the system, and the remote stations 1, 2, . . . n would typically be repeaters or regenerators. All the stations would be connected together by means of some sort of transmission line 11. A second terminal station, not shown, would be located at the other end of line 11 following the last remote station.

Alternatively, station 10 can be a power generating station, and the remote stations 1, 2, 3 . . . n substations from which power distribution lines, not shown, emanate. Whatever the nature of the system, the present invention relates to a means of addressing any one of the remote stations from either the central station, or from any point along the wavepath 11 connecting the stations. In particular, this is done by transmitting a series of m signal bursts, where m is an integer between one and n which designates the remote station to be addressed. For example, if the third station is to be addressed from the central station, three signal bursts are transmitted. If, on the other hand, the third station is to be addressed from a point p along line 11 between stations 1 and 2, only two signal bursts are used, as will be explained herein below.

The addressing signal propagates along line 11 in the direction away from station 10 and is received, in turn, by the remote stations, each of which is designed to remove one of the signal bursts, and to retransmit the remaining bursts. Thus, station 1 receives three signal bursts, deletes one, and transmits only two. Similarly, station 2 receives two bursts, deletes one, and retransmits only one. The stations are further designed to respond in a prescribed way when only one signal burst is received. Accordingly, station 3, which is the station intended to be addressed, upon receiving the one remaining signal burst deletes it, leaving no addressing signal to be transmitted. In addition, station 3 recognizes that only one burst was received and responds in some prescribed manner. The precise response will, of course, depend upon the nature of the system. In a power system, the response may be to connect or disconnect a branch line. In a communication system, the response may be to switch in a standby amplifier, to go through a programmed series of tests, or (as explained in the copending application by D. H. Wolaver, Ser. No. 929,435 filed July 31, 1978, and assigned to applicant's assignee) to loop the system back through a second transmission link for a fixed time interval for remote observation.

If, in the illustrative example, the addressing signal is introduced at point p, only two bursts are required since station 3 is the second station in the sequence of station from p. More generally, the number of bursts required to address a particular station is equal to the number that station is in the sequence of addressable stations from the addressing point.

Figure 2:
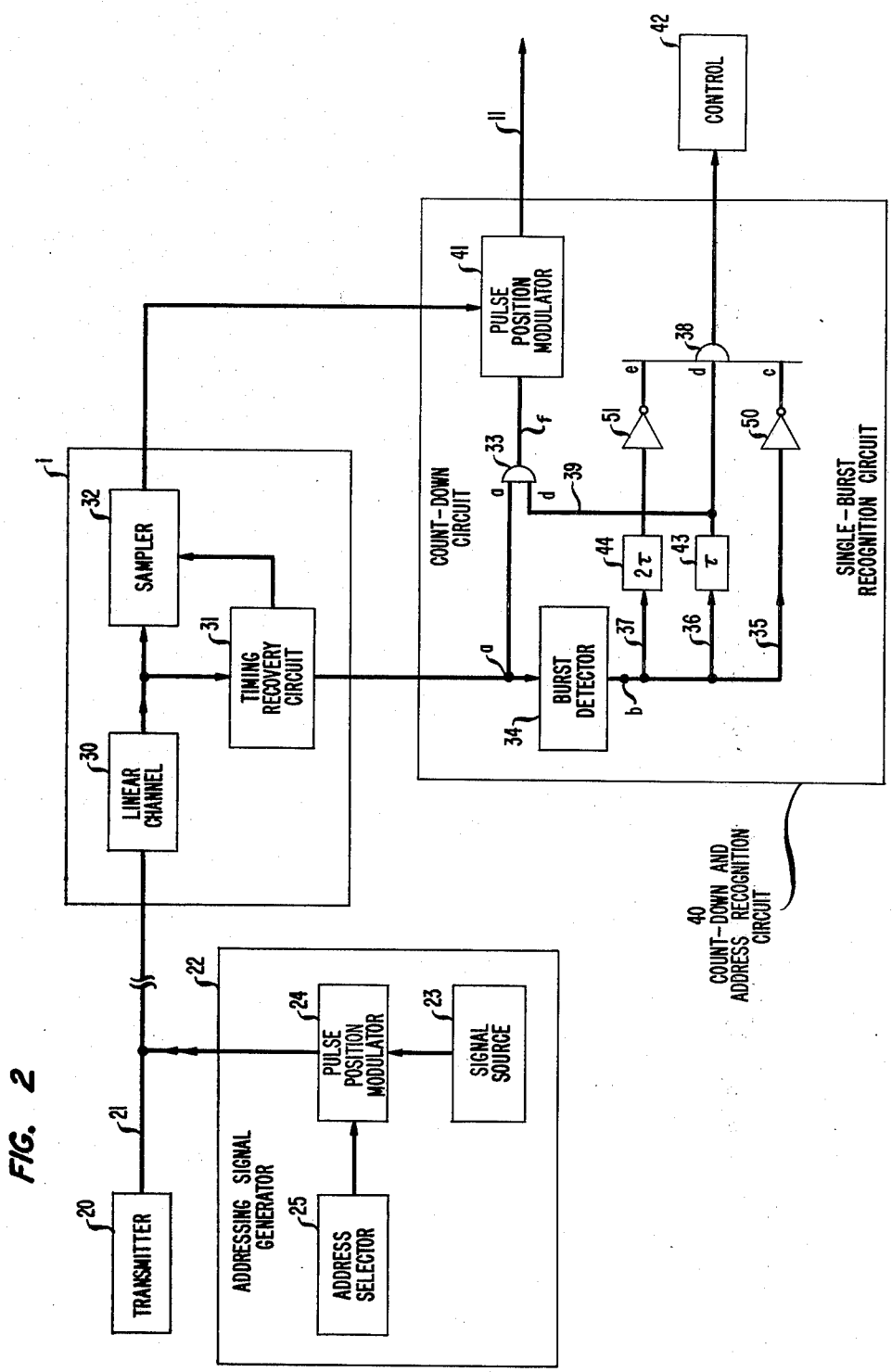
FIG. 2 shows one embodiment of a count-down and address recognition circuit in accordance with the present invention.

The nature of the addressing signal employed will depend upon the transmission capabilities of transmission line 11. In a communication system, an addressing signal that is compatible with the existing equipment is advantageously employed. Beyond this, any type of identifiable signal burst can be employed. For example, the signal from a sinusoidal signal generator can be amplitude, frequency or phase modulated over discrete intervals of time, where each time interval defines one burst. In a digital communication system, a series of pulses, at a prescribed repetition rate, can be used. Alternatively, the addressing signal can be superimposed onto the normal traffic by modulating the latter. For example, in a digital system, a timing jitter can be introduced by pulse position modulating the traffic, or by modulating the signal from a separate, addressing signal generator. This can be an advantageous technique in that is would tend to reduce the amount of added circuitry required at each repeater to recognize an addressing signal, and is the approach used in the illustrative embodiment now to be described in connection with FIG. 2 which shows a portion of a digital communication system. In particular, FIG. 2 shows a transmitter 20 connected, by means of a wavepath 21, to the $i^{th}$ repeater along the wavepath. Also shown at transmitter 20 is an addressing signal generator 22 comprising a signal source 23, a modulator 24, and an address selector 25. In operation, the desired address is selected, initiating the generation of an addressing pulse sequence which pulse position modulates the signal from a pseudodata generator 23 to produce the addressing signal bursts. In this mode of operation, the transmitter is disconnected when the addressing generator is connected.

Typically, a repeater in a digital communication system comprises, as shown in FIG. 2, a linear channel 30 whose output is coupled to a timing recovery circuit 31 and a sampler circuit 32. The timing information derived from the timing recovery circuit 31 is coupled to the sampler circuit for regenerating the digital signal. In a carrier system, a receiver portion would be included at the input end of the repeater and a transmitter portion would be included at the output end. In the illustrative embodiment shown in FIG. 2 neither of these is shown.

Associated with each repeater is a count-down and address recognition circuit 40 which, as indicated hereinabove, does two things. First, it senses the presence of an addressing signal and, employing a count-down technique, retransmits one less signal burst than is received. Secondly, it recognizes when only one signal burst is received, and initiates a response.

The first of these functions is performed by AND-gate 33 in association with a burst detector 34, delay circuit 43, and, in the illustrative embodiment, a pulse position modulator 41. The second function is performed by AND-gate 38 in association with burst detector 34, delay circuits 43, 44, inverters 50, 51, and a controller 42.

In operation, the pulse position modulation impressed upon the addressing signal is demodulated by the phase-locked loop in the timing recovery circuit which senses the burst modulation as an "error". In the usual manner, the modulation is removed by the phase-locked loop circuit and does not appear at the output of the sampler 32.

The demodulated burst signal, derived from the repeater timing recovery circuit, is coupled to one input terminal a of gate 33 and to a burst detector 34. The output from the latter is coupled to the three input ports of a second AND-gate 38 by means of wavepaths 35, 36, and 37, respectively, and to the other input port d of gate 33 by way of wavepath 36 and 39.

The output from gate 33 is coupled to a pulse position modulator 41, along with the regenerated output signal from sampler 32. The output from gate 38 is coupled to a controller 42 which is designed to initiate whatever control functions are prescribed for this particular repeater.

Figure 3:
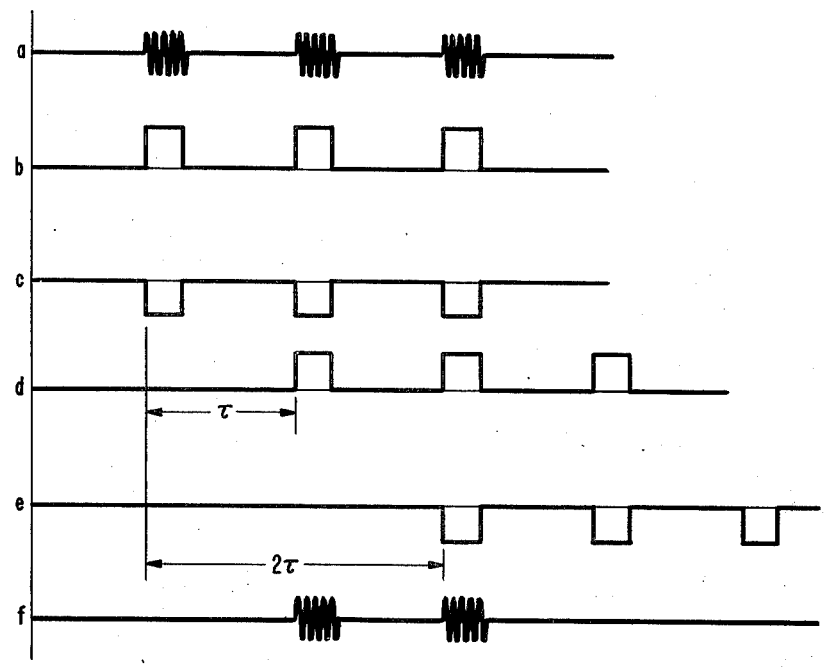
FIGS. 3 and 4, included for purposes of explanation, shows a number of waveforms at various points in the circuit of FIG. 2.

Assuming, for purposes of explanation, that three bursts are received by the repeater, the signal derived from the timing recovery circuit, and applied to gate 33 and detector 34 is as given by waveform a in FIG. 3. The output from the burst detector, given by waveform b, is, in turn, coupled to one input port c of gate 38 through an inverter 50; to a second input port d through a delay circuit 43; and to a third input port e through a delay circuit 44 and an inverter 51. The delay circuits 43 and 44 introduce delays of $\tau$ and $2\tau$, respectively, where $\tau$ is equal to the burst repetition period. The resulting signals appearing at the input to gate 38 are then given by waveforms c, d and e in FIG. 3. In addition, the signal at input port d is coupled to the second input port of gate 33.

Because of the delay introduced by delay circuit 43, only the second and third signal bursts are passed by gate 33, as indicated by gate output waveform f. These are applied to pulse position modulator 41 and serve to remodulate the regenerated signal and, thereby, to reintroduce the addressing signal onto transmission line 11. It will be noted, however, that the output signal includes one less signal burst than was received by the repeater.

With the respect to gate 38, the signals at input ports c and e inhibit transmission through gate 38 and the controller is not activated.

Figure 4:
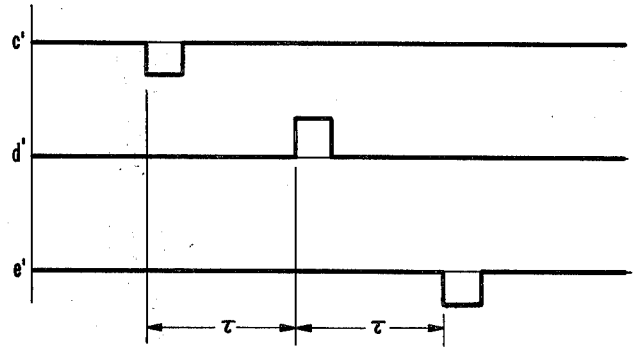

If the $i^{th}$ repeater is, in particular, the addressed repeater, the addressing signal received thereby would include only a single signal burst. As a result, there would be no retransmitted burst inasmuch as there would be no coincidence of signals, as exemplified by the first signal burst in each of waveforms a and d of FIG. 3. On the other hand, with only a single burst applied to each of the input ports of gate 38, as exemplified by waveforms c', d', and e' in FIG. 4, there are no inhibiting signals applied to either port c or e when signal d' is applied to gate input port d. Accordingly, upon receipt of an addressing signal consisting of only one signal bursts the controller is activated, and no addressing signal is retransmitted.

The controller can, for example, be a latch which is activated until a second addressing signal is received and releases the latch, or the controller can be a monostable multivibrator which remains activated for a prescribed period of time.

As indicated hereinabove, it is an advantage of the present invention that the addressing circuit is the same at all of the remote stations. The station to be addressed is identified solely by the number of addressing bursts transmitted.

In the illustrative embodiment described, the first signal burst is deleted. It will be recognized, however, that the last or any other signal burst can just as readily be deleted in accordance with the count-down feature of the present invention.

I claim:

1. Apparatus for addressing one of a plurality of n remote stations distributed along a system capable of transmitting electromagnetic wave energy characterized in that said apparatus includes:

an addressing signal generator (22) coupled to said system (20, 21, i) for generating an addressing signal comprising a series of m signal bursts, where m is an integer between one and n, and designates the station to be addressed;

means (33, 34, 41, 43) at each of said stations for deleting one burst from said series and for retransmitting a series of bursts having one less than the number received;

and further means (34, 38, 43, 44, 50, 51) for recognizing that only a single addressing burst is received.

2. The apparatus according to claim 1 characterized in that said addressing signal comprises an amplitude modulated signal.

3. The apparatus according to claim 1 characterized in that said addressing signal comprises a phase modulated signal.

4. The apparatus according to claim 1 characterized in that said addressing signal comprises a frequency modulated signal.

5. The apparatus according to claim 1 characterized in that each station responds in a prescribed manner when only one addressing signal burst is received.

6. The apparatus according to claim 1 characterized in that said means for deleting a signal burst comprises:

a burst detector (34) coupled to said demodulating means;

means for coupling said demodulator means to one input port of an AND-gate (33);

and means (36, 39, 43) for coupling the output from said detector (34) to a second input port of said gate (33) delayed a period of time equal to the burst repetition period of the addressing signal.

7. The apparatus according to claim 6 characterized in that said remote station includes:

a signal regenerator;

and in that the output from said gate (33) is coupled to a modulator (41) for modulating the regenerator output signal.

8. The apparatus according to claim 1 characterized in that the means for recognizing that only a single addressing burst is received comprises:

a burst detector (34) coupled to said demodulating means;

means (35), including a first inverter (50), for coupling the output from said detector to one input port (c) of an AND-gate (38);

means (36), including a delay circuit (43) having a delay $\tau$, for coupling the output from said detector to a second input port (d) of said gate (38);

and means (37), including a delay circuit (44) having a delay $2\tau$ and a second inverter (51), for coupling the output from said detector to a third input port (e) of gate (38), where $\tau$ is equal to the repetition period of the addressing signal bursts.

* * * * *